(12) United States Patent
Lee et al.

(10) Patent No.: US 9,812,940 B2
(45) Date of Patent: Nov. 7, 2017

(54) OFFSET VOLTAGE GENERATOR AND METHOD FOR GENERATING AN OFFSET VOLTAGE OF THREE-PHASE INVERTER

(71) Applicant: LSIS CO., LTD., Gyeonggi-do (KR)

(72) Inventors: Hak-Jun Lee, Gyeonggi-do (KR); An-No Yoo, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/098,203

(22) Filed: Apr. 13, 2016

(65) Prior Publication Data

US 2016/0322890 A1 Nov. 3, 2016

(30) Foreign Application Priority Data

Apr. 14, 2015 (KR) .................. 10-2015-0052599

(51) Int. Cl.
*H02M 1/08* (2006.01)
*H02M 1/12* (2006.01)
(Continued)

(52) U.S. Cl.
CPC ............... *H02M 1/08* (2013.01); *H02M 1/12* (2013.01); *H02M 7/44* (2013.01); *H02M 7/5395* (2013.01);
(Continued)

(58) Field of Classification Search
CPC ............ H02M 1/08; H02M 7/42; H02M 7/44; H02M 7/48; H02M 7/525; H02M 7/5387;
(Continued)

(56) References Cited

U.S. PATENT DOCUMENTS 6,333,569 B1   12/2001  Kim
8,760,106 B2*   6/2014  Soares .............. H02M 7/53875
                                             318/727
(Continued)

FOREIGN PATENT DOCUMENTS

JP          S6122763 A    1/1986
JP          S62277064 A   12/1987
(Continued)

OTHER PUBLICATIONS

Search report dated Dec. 16, 2016 for related EP application 16160447.5.
(Continued)

*Primary Examiner* — Yemane Mehari
(74) *Attorney, Agent, or Firm* — Nath, Goldberg & Meyer; Jerald L. Meyer

(57) ABSTRACT

In an embodiment, an offset voltage generator includes a first limiter configured to compare a first phase-voltage signal with a maximum limit value and a minimum limit value to output a first limit-voltage signal; a second limiter configured to compare a second phase-voltage signal with the maximum limit value and the minimum limit value to output a second limit-voltage signal; a third limiter configured to compare a third phase-voltage signal with the maximum limit value and the minimum limit value to output a third limit-voltage signal; and a summer configured to add a difference between the first phase-voltage signal and the first limit-voltage signal, a difference between the second phase-voltage signal and the second limit-voltage signal, and a difference between the third phase-voltage signal and the third limit-voltage signal, to output an offset voltage.

10 Claims, 13 Drawing Sheets

(51) Int. Cl.
  *H02M 7/5387* (2007.01)
  *H02M 7/44* (2006.01)
  *H02P 27/06* (2006.01)
  *H02P 27/08* (2006.01)
  *H02M 7/5395* (2006.01)
  *H02M 1/00* (2006.01)
(52) U.S. Cl.
  CPC ... *H02M 7/53871* (2013.01); *H02M 7/53873* (2013.01); *H02P 27/06* (2013.01); *H02P 27/08* (2013.01); *H02P 27/085* (2013.01); *H02M 2001/0025* (2013.01); *H02M 2001/0048* (2013.01); *H02M 2007/53876* (2013.01); *H02P 2209/13* (2013.01); *Y02B 70/1491* (2013.01)
(58) Field of Classification Search
  CPC ... H02M 2001/0048; H02M 2001/123; H02M 3/156–3/158; H02P 27/08
  USPC ...................................................... 363/95–99
  See application file for complete search history.

(56) References Cited

U.S. PATENT DOCUMENTS 8,766,588 B2 * 7/2014 Soares .................... H02P 27/08
 318/727

2009/0200970 A1 * 8/2009 Kimura .................... H02P 27/08
 318/400.3
2010/0060211 A1 * 3/2010 Hashimoto ............. H02P 21/22
 318/400.02
2012/0249043 A1 10/2012 Soares

FOREIGN PATENT DOCUMENTS

| | | |
|---|---|---|
| JP | H0549286 A | 2/1993 |
| JP | 05-268773 A | 10/1993 |
| JP | 10-052062 A | 2/1998 |
| JP | 2005137076 A | 5/2005 |
| JP | 3677804 B2 | 8/2005 |
| JP | 2005253229 A | 9/2005 |
| JP | 2007135280 A | 5/2007 |
| KR | 100168807 B1 | 10/1998 |
| KR | 20020023581 A | 3/2002 |
| KR | 101421017 B1 | 7/2014 |

OTHER PUBLICATIONS

Japanese Office Action dated Apr. 11, 2017 corresponding to application No. 2016-079506.

* cited by examiner

OFFSET VOLTAGE GENERATOR AND METHOD FOR GENERATING AN OFFSET VOLTAGE OF THREE-PHASE INVERTER

CROSS REFERENCE TO RELATED APPLICATION

This application claims the benefit of Korean Patent Application No. 10-2015-0052599, filed on Apr. 14, 2015, which is hereby incorporated by reference in its entirety.

BACKGROUND

1. Technical Field

The present disclosure relates to an offset voltage generator and a method for generating an offset voltage for controlling continuous modulation and discontinuous modulation of a three-phase inverter.

2. Description of the Related Art

As power semiconductor technology evolves, it has become easier to implement variable voltage and variable frequency (VVVF) driver by using power devices that can be switched at high speed. A voltage source inverter that typically receives DC voltage source to generate AC variable voltage source is commonly employed as a circuit for generating variable voltage variable frequency. Such a voltage source inverter is commonly employed by energy storage system (ESS), PV inverter, motor drive technologies.

In modulating voltage generated by such a voltage source inverter, a variety of types of modulation schemes may be employed. One of the most commonly used modulation scheme is pulse width modulation (PWM) scheme. The PWM scheme may be divided into continuous modulation scheme and discontinuous modulation scheme. Examples of the continuous modulation mode may include sinusoidal PWM (SPWM), space vector PWM (SVPWM), etc. Examples of the discontinuous modulation mode may include 60° discontinuous PWM (DPWM) for reducing switching loss of a power semiconductor.

In such continuous or discontinuous modulation modes, an offset voltage is compared to a carrier wave such as a triangular wave to modulate voltage. In doing so, different offset voltages are used in the continuous and discontinuous modulation modes. In the related art, there is a problem in that when a three-phase inverter is switched from the continuous modulation mode to the discontinuous modulation mode, an offset voltage for the discontinuous modulation mode has to be calculated according to a modulation index MI.

SUMMARY

It is an aspect of embodiments of the present disclosure to provide an offset voltage generator and a method for generating an offset voltage of a three-phase inverter that allow voltage modulation mode of the three-phase inverter to easily switch from a continuous modulation mode to a discontinuous modulation mode by simply adjusting weight, without additionally calculating another offset voltage.

It is another aspect of embodiments of the present disclosure to provide an offset voltage generator and a method for generating an offset voltage of a three-phase inverter, by which total harmonic distortion (THD) in a period with a low modulation index can be reduced compared to the discontinuous modulation scheme in the related art, and switching loss can be reduced in comparison with the continuous modulation scheme in the related art, by way of adjusting the discontinuous modulation period.

Other objects of the present disclosure are not limited to the above-described object and other objects and advantages can be appreciated by the following description described with reference to the embodiments of the present disclosure. Further, it will be easily appreciated that the objects and advantages of the present disclosure can be realized by means and a combination thereof recited in the appended claims.

In accordance with one aspect of some embodiments of the present disclosure, an offset voltage generator includes: a first limiter configured to compare a first phase-voltage signal with a maximum limit value and a minimum limit value to output a first limit-voltage signal; a second limiter configured to compare a second phase-voltage signal with the maximum limit value and the minimum limit value to output a second limit-voltage signal; a third limiter configured to compare a third phase-voltage signal with the maximum limit value and the minimum limit value to output a third limit-voltage signal; and a summer configured to add a difference between the first phase-voltage signal and the first limit-voltage signal, a difference between the second phase-voltage signal and the second limit-voltage signal, and a difference between the third phase-voltage signal and the third limit-voltage signal, to output an offset voltage. The maximum limit value and the minimum limit value are determined by a predetermined weight and a DC link voltage of the three-phase inverter.

In accordance with another aspect of some embodiments of the present disclosure, a three-phase inverter control device for controlling switching operations of a plurality of switching elements in a three-phase inverter includes: a pole-voltage signal generator configured to compare a first phase-voltage signal, a second phase-voltage signal and a third phase-voltage signal with a maximum limit value and a minimum limit value, respectively, to generate an offset voltage, and add the offset voltage to the first phase-voltage signal, the second phase-voltage signal and the third phase-voltage signal to generate a first pole-voltage signal, a second pole-voltage signal and a third pole-voltage signal, respectively; and a control signal generator configured to compare the first pole-voltage signal, the second pole-voltage signal and the third pole-voltage signal with a carrier wave, to generate control signals for the plurality of switching elements, wherein the maximum limit value and the minimum limit value are determined by a predetermined weight and a DC link voltage of the three-phase inverter.

As set forth above, according to an embodiment of the present disclosure, the voltage modulation mode of a three-phase inverter can be easily switched from the continuous modulation mode to the discontinuous modulation mode by simply adjusting the weight k, without additionally calculating another offset voltage.

In addition, according to an embodiment of the present disclosure, a discontinuous modulation period is adjusted, such that total harmonic distortion (THD) in a period with a low modulation index can be reduced compared to the discontinuous modulation scheme in the related art, and switching loss can be reduced in comparison with the continuous modulation scheme in the related art.

DETAILED DESCRIPTION

Figure 1:
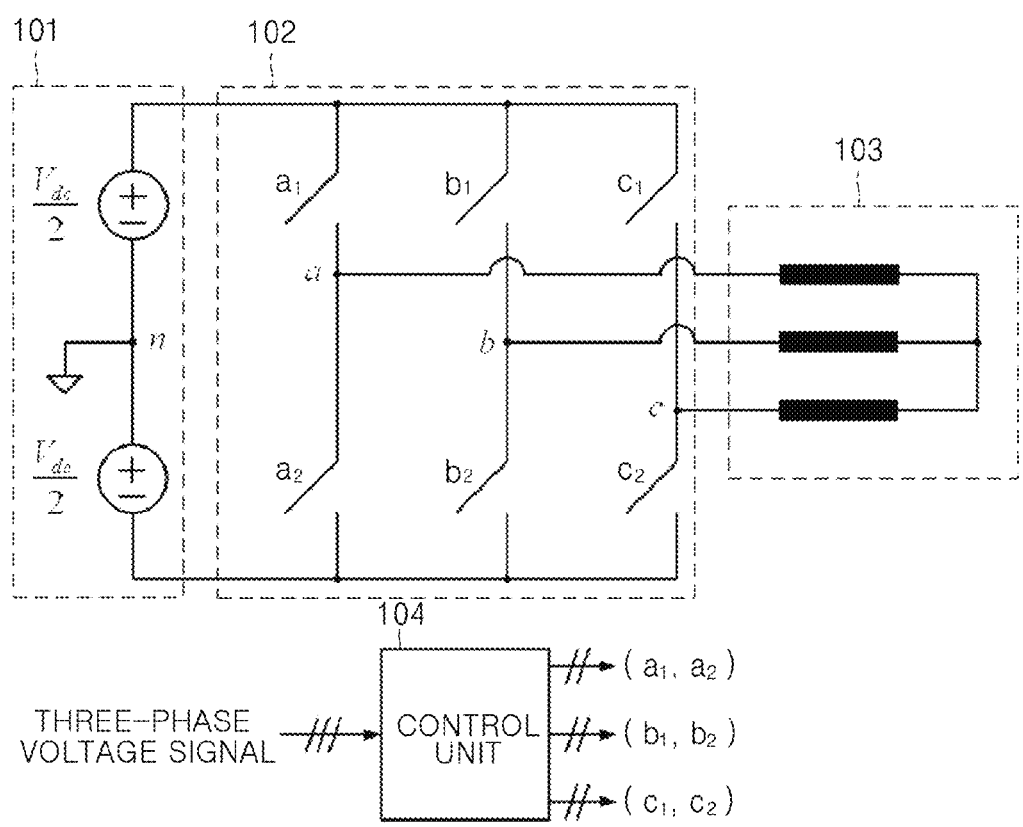
FIG. 1 shows an example of a three-phase inverter to which a method for generating an offset voltage of a three-phase inverter according to an embodiment of the present disclosure is applied.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

FIG. 1 shows an example of a three-phase inverter to which a method for generating an offset voltage of a three-phase inverter according to an embodiment of the present disclosure is applied. The three-phase inverter shown in FIG. 1 is a typical two-level three-phase voltage source inverter used in driving an ESS or motor drive.

Referring to FIG. 1, the three-phase inverter includes a smoothing part 101 and a switching part 102. The three-phase inverter rectifies a three-phase AC voltage from an external device to a DC voltage by a rectifier (not shown). The rectified DC voltage is smoothed via the smoothing part 101 shown in FIG. 1 to DC link voltages of $V_{dc}/2$ at two DC links. The symbol n in FIG. 1 represents a virtual DC link neutral point.

The smoothed DC link voltages $V_{dc}/2$ are converted to a three-phase AC voltage via a number of switching elements a1, a2, b1, b2, c1 and c2 in the switching part 102. The switching element a1 and the switching element a2 are turned on/off in a complementary fashion. Likewise, the switching element b1 and the switching element b2 are turned on/off in a complementary fashion, and the switching element c1 and the switching element c2 are turned on/off in a complementary fashion.

The three-phase AC voltage generated via the switching operations of the switching part 102 is input to a load 103 such as an electric motor.

The switching elements a1, a2, b1, b2, c1 and c2 in the switching part 102 are turned on/off in a complementary fashion, respectively, to generate a three-phase AC voltage. The switching operations (on/off operations) of the switching elements a1, a2, b1, b2, c1 and c2 are performed in accordance with control signals output from a PWM control unit 104 as shown in FIG. 1. The PWM control unit 104 generates control signal for controlling the switching operations of the switching elements a1, a2, b1, b2, c1 and c2 using a three-phase-voltage signal input from an external device.

Figure 2:
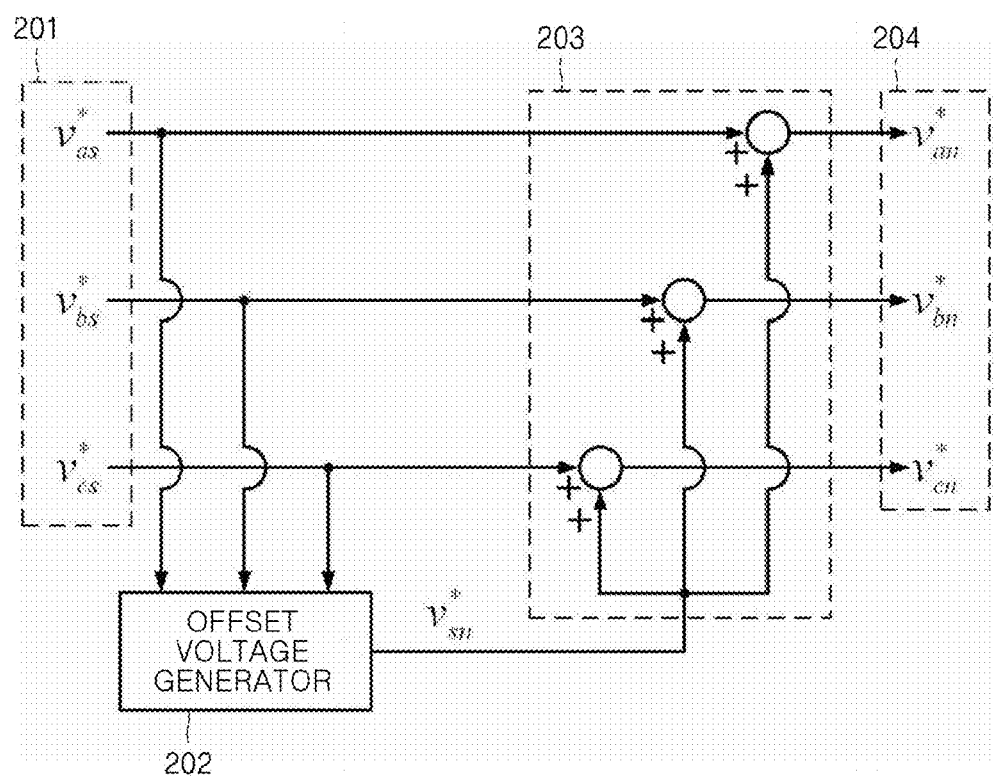
FIG. 2 shows a process of generating a three-phase pole voltage signal by a pole voltage signal generator in the PWM control unit in the related art.

FIG. 2 shows a process of generating a three-phase pole-voltage signal by a pole-voltage signal generator in the PWM control unit 104 in the related art.

Referring to FIG. 2, the pole-voltage signal generator in the PWM control unit 104 adds three phase-voltage signals 201 including a first phase-voltage signal $V^*_{as}$, a second phase-voltage signal $V^*_{bs}$ and a third phase-voltage signal $V^*_{cs}$ to an offset voltage $V^*_{sn}$ generated in an offset voltage generator 202, respectively, thereby generating three-phase pole-voltage signals 203 including a first pole-voltage signal $V^*_{an}$, a second pole-voltage signal $V^*_{bn}$ and a third pole-voltage signal $V^*_{cn}$. The offset voltage $V^*_{sn}$ is a component that commonly exists in the pole-voltage signals 203, and is a zero sequence voltage such that it does not affect the combination of phase-to-phase voltages.

Accordingly, the relationship is established among the pole-voltage signals 203, the phase-voltage signals 201 and the offset voltage signal $V^*_{sn}$ as expressed in Equation 1:

$$V^*_{an} = V^*_{as} + V^*_{sn}$$

$$V^*_{bn} = V^*_{bs} + C^*_{sn}$$

$$V^*_{cn} = V^*_{cs} + V^*_{sn} \quad \text{[Equation 1]}$$

Figure 3:
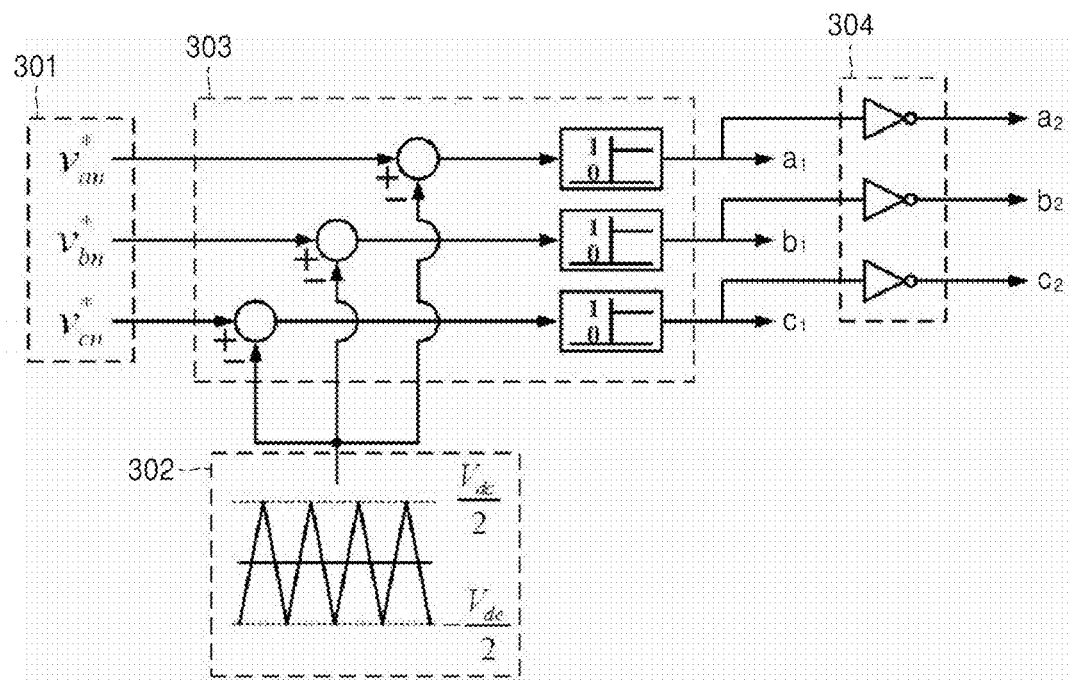
FIG. 3 shows a process that a control signal generator in the PWM control unit generates a control signal for switching elements by using three-phase pole-voltage signals in the related art.

FIG. 3 shows a process that a control signal generator in the PWM control unit 104 generates a control signal for switching elements by using three-phase pole-voltage signals in the related art.

The pole-voltage signals 301 generated via the process of FIG. 2, i.e., the first pole-voltage signal $V^*_{an}$, the second pole-voltage signal $V^*_{bn}$ and the third pole-voltage signal $V^*_{cn}$ are compared with a carrier wave 302 as shown in FIG. 3. Although the carrier wave 302 shown in FIG. 3 is a triangular carrier wave, other types of carrier waves may also be used depending on the modulation scheme. As shown in FIG. 3, the cycle of the carrier wave 302 is equal to the switching frequency. The peak has the maximum value of $V_{dc}/2$ and the minimum value of $-V_{dc}/2$.

In the related art, as shown in FIG. 3, the difference between each of the pole-voltage signals 201 and the carrier wave 302 is calculated, and the value of 1 is output if the difference is equal to or greater than 0, and the value of 0 is output if the difference is less than 0 (as indicated by reference numeral 303). Accordingly, an on-signal is output to the switching elements a1, b1 and c1 if the difference between each of the pole-voltage signals 201 and the carrier wave 302 is greater than 0, and an on-signal is output to the switching elements a2, b2 and c2 if the difference between each of the pole-voltage signals 201 and the carrier wave 302 is less than 0 by NOT gates 304.

In the processes of generating control signals by the PWM control unit 104 in the related art as shown in FIGS. 2 and 3, the modulation mode is finally determined based on the offset voltage $V^*_{sn}$ generated in the offset voltage generator 202. For example, the offset voltage $V^*_{sn}$ for sinusoidal PWM (SPWM), which is a continuous modulation mode, is as follows:

$$v^*_{sn} = 0 \quad \text{[Equation 2]}$$

In addition, the offset voltage $V^*_{sn}$ for space vector PWM (SVPWM) is as follows:

$$v^*_{sn} = -\frac{v_{max} + v_{min}}{2} \quad \text{[Equation 3]}$$

where Vmax denotes the largest one of the first phase-voltage signal $V^*_{as}$, the second phase-voltage signal $V^*_{bs}$ and the third phase-voltage signal and $V^*_{cs}$, and $V_{min}$ denotes the smallest one thereof. The space vector PWM (SVPWM) expressed in Equation 3 is a continuous modulation scheme in which control signals for all of the switching elements are changed for a cycle of a carrier wave.

In contrast, in a discontinuous modulation scheme, a control signal for a switching element in a phase does not change, in order to reduce switching loss. One of the most commonly used discontinuous voltage modulation scheme is 60° discontinuous PWM (DPWM), in which switching discontinuous periods of 60° exist around the peak of a phase-voltage signal. The 60° DPWM has the offset voltage $V^*_{sn}$ as follows:

$$v^*_{sn} = \frac{V_{dc}}{2} - v_{max} \quad \text{(if, } v_{max} + v_{min} \geq 0\text{)} \quad \text{[Equation 4]}$$
$$v^*_{sn} = \frac{V_{dc}}{2} - v_{min} \quad \text{(if, } v_{max} + v_{min} < 0\text{)}$$

As described above, in the PWM control using the offset voltage, different offset voltages have to be calculated in order to switch from the continuous modulation mode to the discontinuous modulation mode, as expressed in Equations 2 to 4.

In addition, there is a drawback in the related art in that although switching loss is reduced, the total harmonic distortion (THD) in the output current increases. Further, there is a drawback in the related art in that although the THD in the output current is low in comparison with the discontinuous modulation mode, switching loss increases.

In addition, according to the existing discontinuous modulation mode using the offset voltage, the discontinuous modulation period is always set to 120° of a cycle of a fundamental wave. Accordingly, when the modulation index MI is low, the THD in the output current is very large in the discontinuous modulation mode. As a result, there is another problem in the modulation index by which discontinuous modulation starts is restricted in order to reduce switching loss.

In order to overcome such problems, there are provided an offset voltage generator and a method for generating an offset voltage of a three-phase inverter that allow voltage modulation mode of the three-phase inverter to easily switch from a continuous modulation mode to a discontinuous modulation mode by simply adjusting weight, without additionally calculating another offset voltage.

Figure 4:
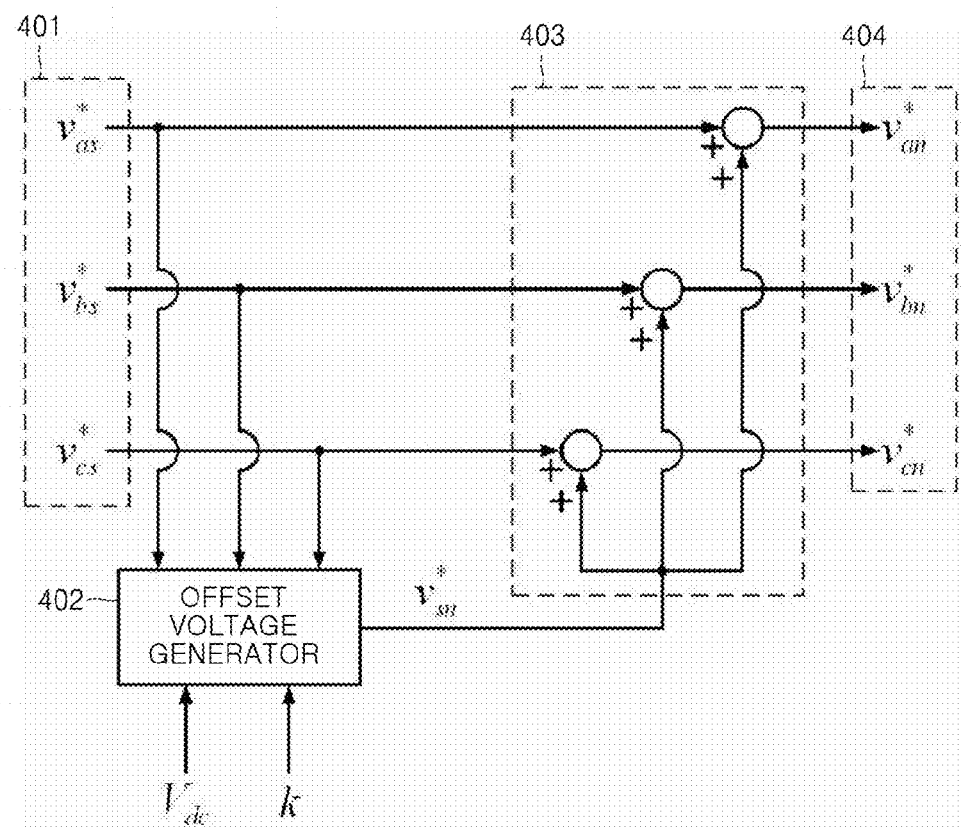
FIG. 4 is a block diagram of a pole-voltage signal generator included in a PWM control unit according to an embodiment of the present disclosure.

FIG. 4 is a block diagram of a pole-voltage signal generator included in a PWM control unit 104 according to an embodiment of the present disclosure.

Referring to FIG. 4, the pole-voltage signal generator adds three phase-voltage signals 401 including a first phase-voltage signal $V^*_{as}$, a second phase-voltage signal $V^*_{bs}$ and a third phase-voltage signal $V^*_{cs}$ to an offset voltage $V^*_{sn}$ generated in an offset voltage generator 402, respectively, (as indicated by reference numeral 403), thereby generating three-phase pole-voltage signals 404 including a first pole-voltage signal $V^*_{an}$, a second pole-voltage signal $V^*_{bn}$ and a third pole-voltage signal $V^*_{cn}$.

In FIG. 4, the offset voltage generator 402 according to the embodiment of the present disclosure generates an offset voltage $V^*_{sn}$ by using phase-voltage signals 401, a predetermined weight k and a DC link voltage $V_{dc}$ of the three-phase inverter.

The offset voltage $V^*_{sn}$ of the inverter shown in FIG. 1 has the range as expressed in Equation 5 below:

$$-\frac{V_{dc}}{2} - v_{min} \leq v^*_{sn} \leq \frac{V_{dc}}{2} - v_{max} \quad \text{[Equation 5]}$$

If the offset voltage $V^*_{sn}$ is $$\frac{V_{dc}}{2} - v_{max} \text{ or } -\frac{V_{dc}}{2} - v_{min},$$

the pole-voltage signals 404 always become $V_{dc}/2$ or $-V_{dc}/2$ when the phase-voltage signal 401 have the maximum value, and accordingly the PWM control unit 104 operates in a discontinuous modulation mode.

In contrast, the offset voltage $V^*_{sn}$ according to the embodiment of the present disclosure is defined by using the predetermined weight k as expressed in Equation 6 below:

$$v^*_{sn} = 0 \quad \left(\text{if, } -k\frac{V_{dc}}{2} \leq v_{max}, v_{min} \leq k\frac{V_{dc}}{2}\right) \quad \text{[Equation 6]}$$
$$v^*_{sn} = \frac{V_{dc}}{2} - v_{max} \quad \left(\text{if, } k\frac{V_{dc}}{2} \leq v_{max}\right)$$
$$v^*_{sn} = -\frac{V_{dc}}{2} - v_{min} \quad \left(\text{if, } v_{min} \leq -k\frac{V_{dc}}{2}\right)$$

where k has the range of 0≤k≤1.

Hereinafter, a process of generating an offset voltage $V^*_{sn}$ by the offset voltage generator 402 according to Equation 6 will be described in detail with reference to FIG. 5.

Figure 5:
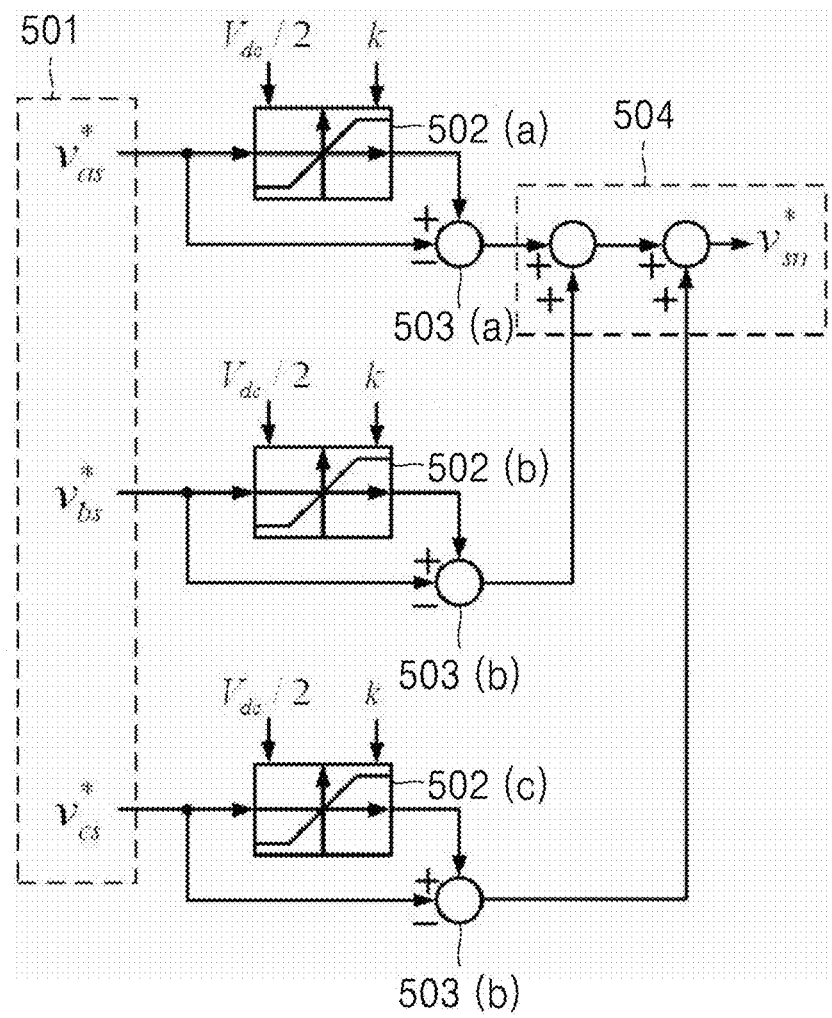
FIG. 5 is block diagram of the offset voltage generator according to an embodiment of the present disclosure.

FIG. 5 is block diagram of the offset voltage generator 402 according to an embodiment of the present disclosure.

Referring to FIG. 5, the offset voltage generator 402 according to the embodiment generates an offset voltage $V^*_{sn}$ by using three phase-voltage signals $V^*_{as}$, $V^*_{bs}$ and $V^*_{cs}$ and corresponding limit signals $V_{as}$, $V_{bs}$ and $V_{cs}$ according to Equation 7 below:

$$V^*_{sn} = -(V^*_{as} - V_{as} + V^*_{bs} + V_{bs} + V^*_{cs} + V_{cs}) \quad \text{[Equation 7]}$$

where the limit signals $V_{as}$, $V_{bs}$ and $V_{cs}$ are defined as follows:

$$v_{as} = \text{bound}\left(\left(-k\frac{V_{dc}}{2}, -\frac{V_{dc}}{2}\right), \left(k\frac{V_{dc}}{2}, \frac{V_{dc}}{2}\right), v_{as}^*\right) \quad \text{[Equation 8]}$$

$$v_{bs} = \text{bound}\left(\left(-k\frac{V_{dc}}{2}, -\frac{V_{dc}}{2}\right), \left(k\frac{V_{dc}}{2}, \frac{V_{dc}}{2}\right), v_{bs}^*\right)$$

$$v_{cs} = \text{bound}\left(\left(-k\frac{V_{dc}}{2}, -\frac{V_{dc}}{2}\right), \left(k\frac{V_{dc}}{2}, \frac{V_{dc}}{2}\right), v_{cs}^*\right)$$

where the function bound ( ) is defined as follows:

$$\text{bound}((a, b), (c, d), x) = \begin{cases} b & x < a \\ d & x > c \\ x & a \leq x \leq c \end{cases} \quad \text{[Equation 9]}$$

The offset voltage generator 402 according to the embodiment of the present disclosure generates the offset voltage $V^*_{sn}$ as expressed in Equation 7 in the following manner. Referring to FIG. 5, the offset voltage generator 402 according to the embodiment of the present disclosure includes a first limiter 502(a), a second limiter 502(b) and a third limiter 502(c) respectively corresponding to the first phase-voltage signal $V^*_{as}$, the second phase-voltage signal $V^*_{bs}$ and the third phase-voltage signal $V^*_{cs}$.

The first limiter 502(a) receives the first phase-voltage signal $V^*_{as}$ and compares the received first phase-voltage signal $V^*_{as}$ with the maximum limit value and the minimum limit value to output the first limit signal $V_{as}$. In this embodiment, the maximum limit value may be set to $$k\frac{V_{dc}}{2},$$

and the minimum limit value may be set to $$-k\frac{V_{dc}}{2},$$

where k denotes a predetermined weight.

In this embodiment, the first limiter 502(a) outputs the first phase-voltage signal $V^*_{as}$ as the first limit signal $V_{as}$ if the first phase-voltage signal $V^*_{as}$ is equal to or greater than the minimum limit value and equal to or less than the maximum limit value. In addition, the first limiter 502(a) outputs the minimum limit value as the first limit signal $V_{as}$ if the first phase-voltage signal $V^*_{as}$ is less than the minimum limit value. In addition, the first limiter 502(a) outputs the maximum limit value as the first limit signal $V_{as}$ if the first phase-voltage signal $V^*_{as}$ is greater than the maximum limit value.

The second limiter 502(b) and the third limiter 502(c) also output the second limit signal $V_{bs}$ and the third limit signal $V_{cs}$, respectively, in the same manner as the first limiter 502(a) described above.

Then, the offset voltage generator 402 outputs, as the offset voltage V*sn, the sum of the difference between the first limit signal $V_{as}$ and the first phase-voltage signal $V^*_{as}$, the difference between the second limit signal $V_{bs}$ and the second phase-voltage signal $V^*_{bs}$, and the difference between the third limit signal $V_{cs}$ and the third phase-voltage signal $V^*_{cs}$, as shown in FIG. 5.

In FIG. 5, the offset voltage V*sn generated by the offset voltage generator 402 becomes 0 if the three phase-voltage signals 501 are between the minimum limit value and the maximum limit value. When the offset voltage V*sn is 0, the PWM control unit 104 of FIG. 1 is operated in the SPWM mode that is a continuous modulation scheme. On the other hand, if the phase-voltage signals 501 are greater than the maximum limit value or less than the minimum limit value, the offset voltage becomes $$v_{sn}^* = \frac{V_{dc}}{2} - v_{max} \text{ or } v_{sn}^* = -\frac{V_{dc}}{2} - v_{max}.$$

Accordingly, the pole-voltage signal becomes $V_{dc}/2$ or $-V_{dc}/2$, such that the PWM control unit 104 is switched to the discontinuous modulation mode. When the PWM control unit 104 operates in the discontinuous modulation mode, the discontinuous modulation period of the PWM control unit 104 is determined by the weight k.

Consequently, according to the embodiment of the present disclosure, the voltage modulation mode of the three-phase inverter can be easily switched from the continuous modulation mode to the discontinuous modulation mode by simply adjusting the weight k, without additionally calculating another offset voltage.

Hereinafter, a range of the weight k when the PWM control unit 104 according to an embodiment of the present disclosure operates in the discontinuous modulation mode will be described with reference to FIGS. 6 to 8.

In order for the PWM control unit 104 to operate in the discontinuous modulation mode, the weight k has to lie within a predetermined discontinuous operation range. The discontinuous operation range is determined by a modulation index MI. The modulation index is defined as expressed in Equation 10 below:

$$MI = \frac{V_m}{V_{dc}/2} \quad \text{[Equation 10]}$$

where $V_m$ denotes the magnitude of phase-voltage signal.

According to the embodiment, the discontinuous modulation of the PWM control unit 104 starts when the modulation index MI is greater than the weight k, and the discontinuous modulation period of the PWM control unit 104 is longer when the modulation index MI is larger.

Figure 6:
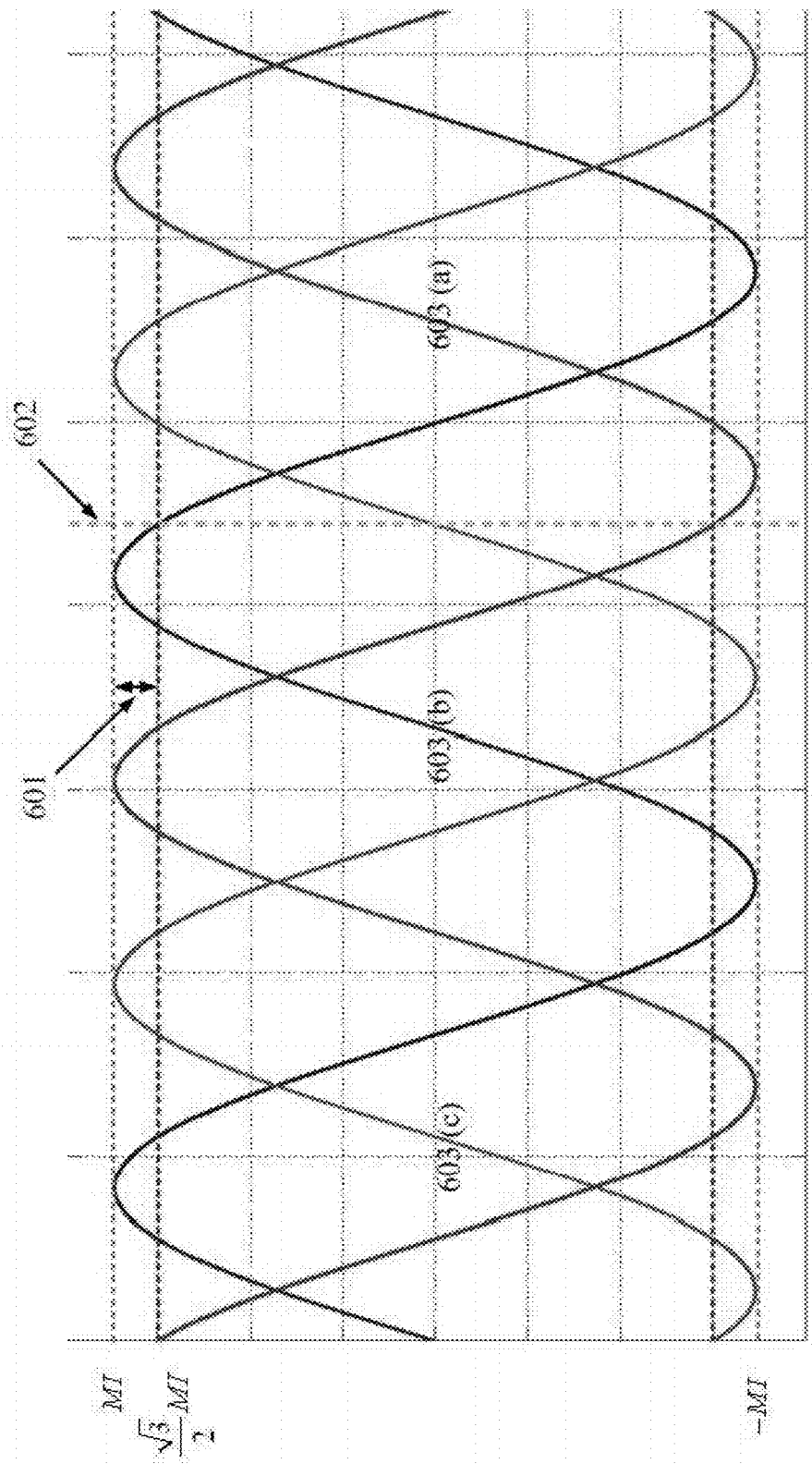
FIG. 6 is a graph showing a relationship between three phase-voltage signals and a modulation index according to an embodiment of the present disclosure.

FIG. 6 is a graph showing a relationship between three phase-voltage signals and the modulation index according to an embodiment of the present disclosure.

The graph shown in FIG. 6 shows waveforms of a first phase-voltage signal 603(a), a second phase-voltage signal 603(b) and a third phase-voltage signal 603(c), which are normalized to the DC link voltage $V_{dc}/2$. As shown in FIG. 6, the maximum value and the minimum value of the first phase-voltage signal 603(a), the second phase-voltage signal 603(b) and the third phase-voltage signal 603(c) are MI and -MI, respectively.

FIG. 6 shows an allowable range 601 of the weight k. As described above, the discontinuous modulation starts when the weight k is smaller than the modulation index MI. When the weight k is equal to the modulation index MI, the PWM control unit 104 operates in the SPWM mode.

In FIG. 6, the minimum value 602 of the weight k is $$\frac{\sqrt{3}}{2}MI.$$

When the weight k is the minimum value 602, the PWM control unit 104 operates in 60° DPWM mode that is a discontinuous modulation mode.

As can be seen from FIG. 6, the discontinuous modulation of the PWM control unit 104 starts when k<MI, and the relationship $$k \geq \frac{\sqrt{3}}{2} MI$$

has to be met. Since the weight k has to lie within the range of 0≤k≤1, the discontinuous operation range is defined finally as follows:

$$\frac{\sqrt{3}}{2} \leq \frac{k}{MI} \leq 1, 0 \leq k \leq 1 \qquad \text{[Equation 11]}$$

Figure 7:
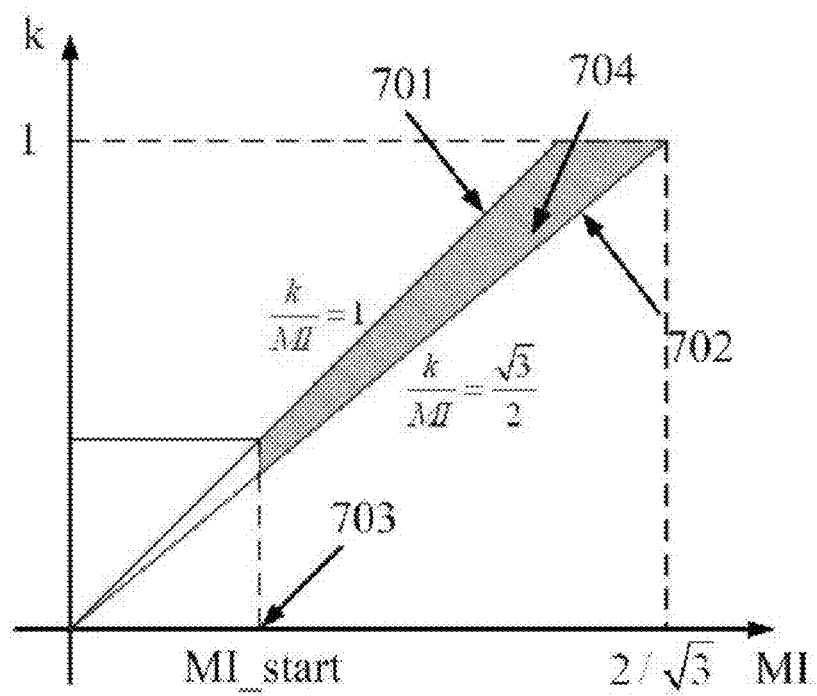
FIG. 7 is a graph showing a relationship between a weight and a modulation index according to an embodiment of the present disclosure.

FIG. 7 is a graph showing a relationship between the weight and modulation index according to an embodiment of the present disclosure.

In order for the PWM control unit 104 to operate in the discontinuous modulation mode, the gradient of weight k with respect to modulation index MI has to be equal to or less than 1 (as indicated by reference numeral 701), as shown in FIG. 7. In particular, when the PWM control unit 104 operates in 60° DPWM, the gradient of the weight k with respect to modulation index MI becomes $$\frac{\sqrt{3}}{2},$$

as shown in FIG. 7. In FIG. 7, MI_start indicates a discontinuous modulation start point 703 at which the PWM control unit 104 starts to operate in the discontinuous modulation mode.

Accordingly, as shown in FIG. 7, when the PWM control unit 104 operates in the discontinuous modulation mode, the weight k has to lie within a discontinuous operation range 704.

Figure 8:
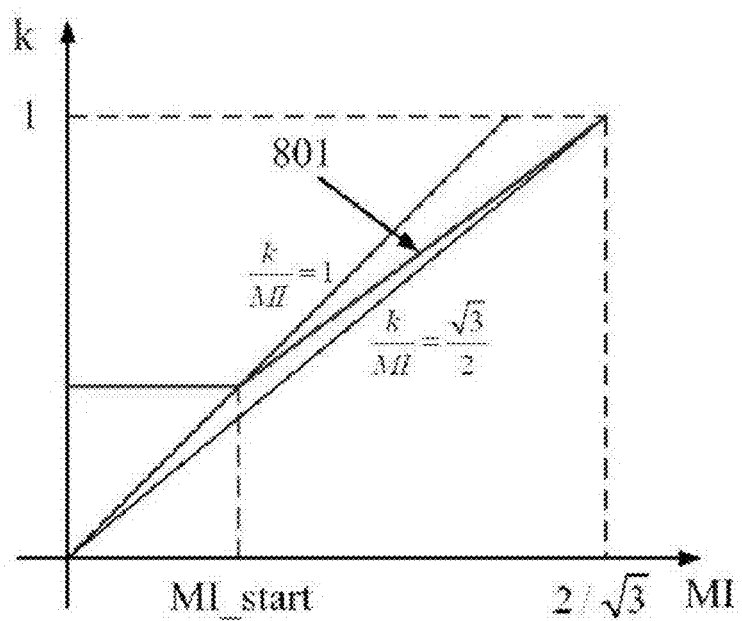
FIG. 8 is a graph showing a weight having any value within the discontinuous operation range according to an embodiment of the present disclosure.
Figure 9:
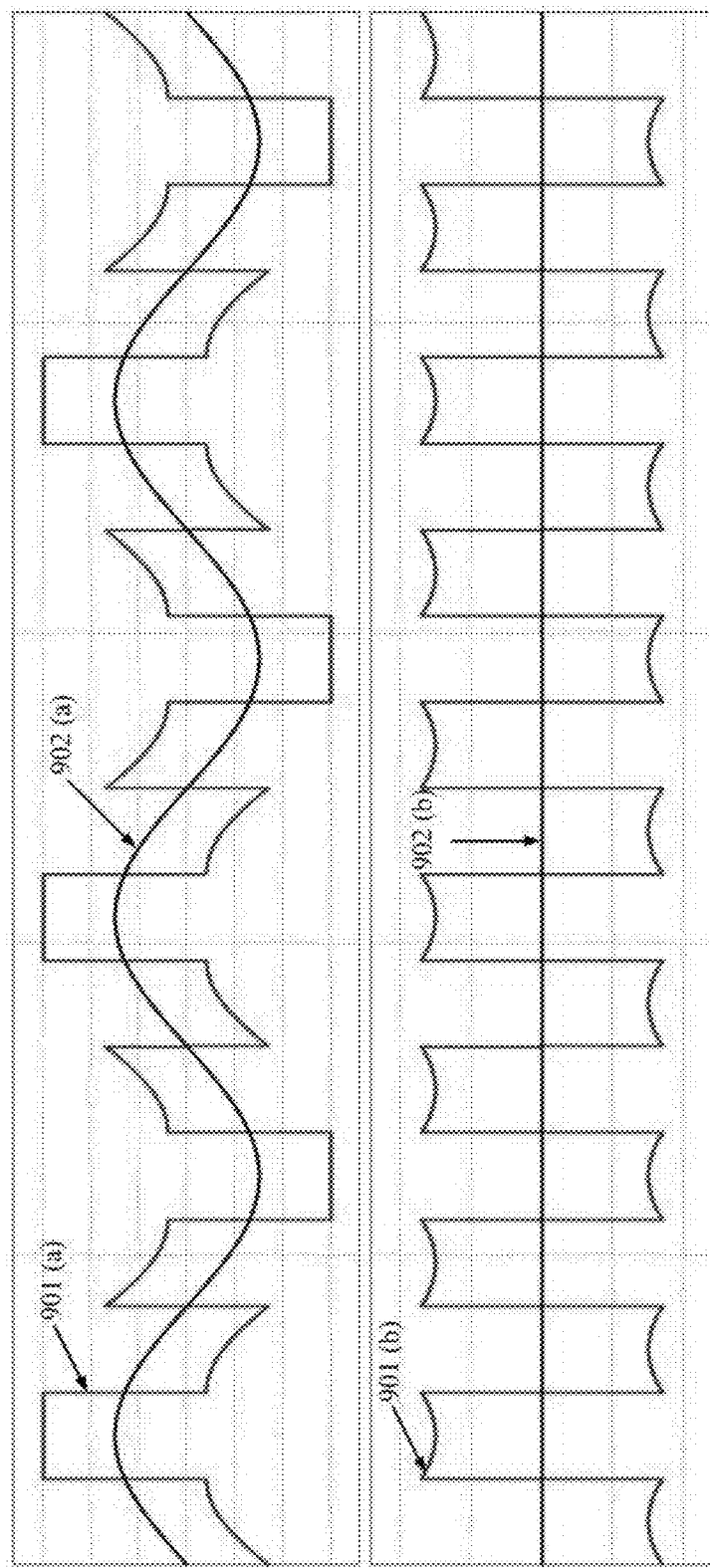
FIGS. 9 to 11 are graphs for comparing waveforms of an offset voltage and pole-voltage according to an embodiment of the PWM control scheme of the present disclosure with waveforms of 60° DPWM in the related art by varying the modulation index MI according to the weight set as shown in FIG. 8.
Figure 10:
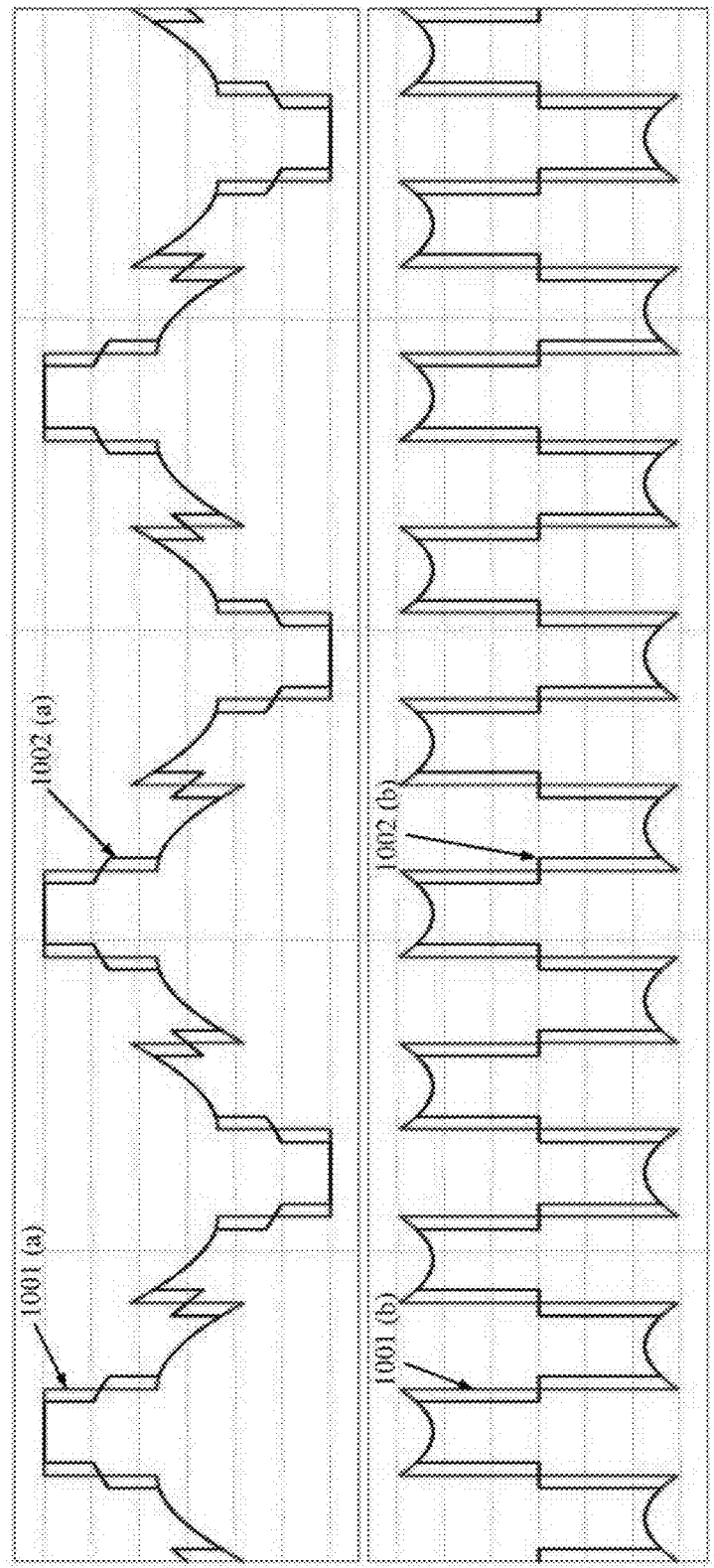
Figure 11:
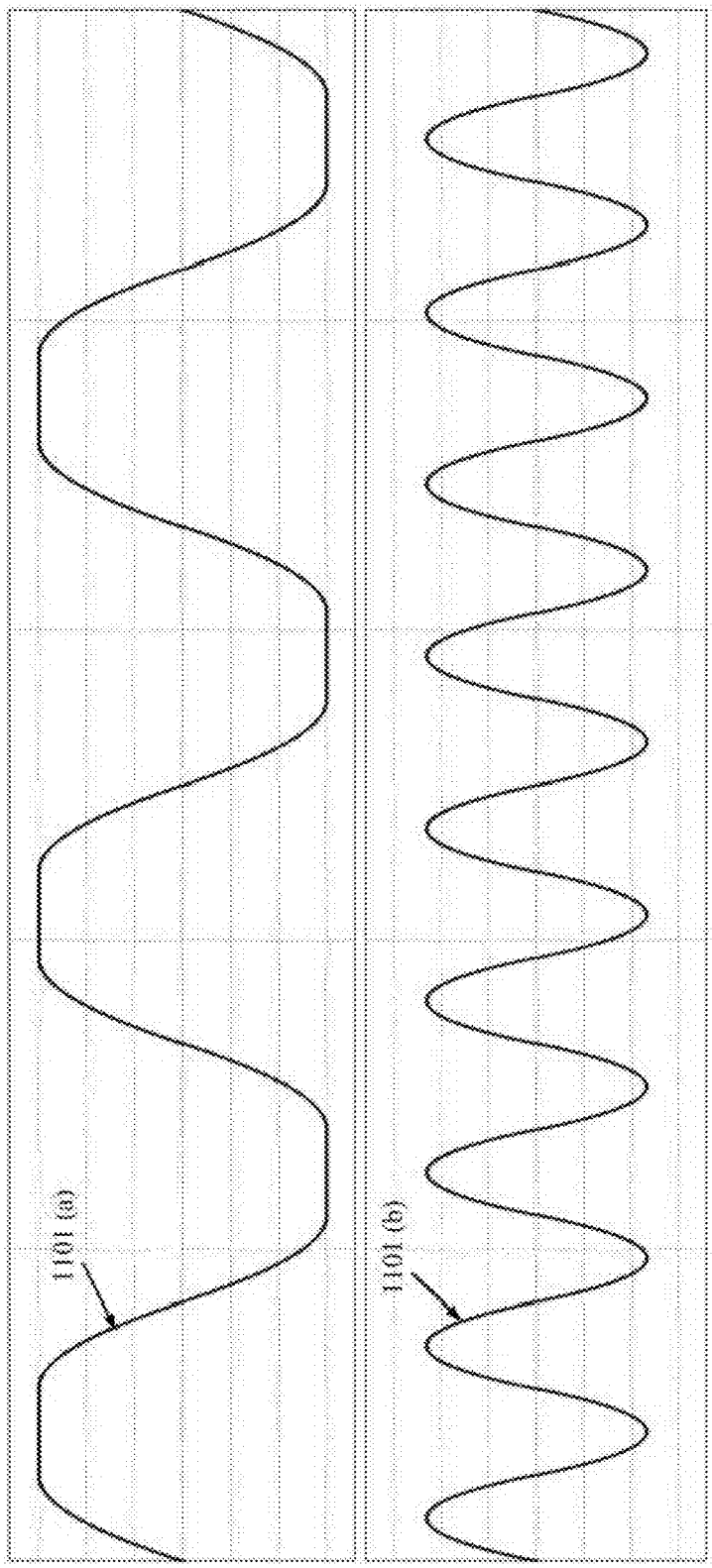

FIG. 8 is a graph showing a weight 801 having any value within the discontinuous operation range according to an embodiment of the present disclosure. FIGS. 9 to 11 are graphs for comparing waveforms of an offset voltage and pole-voltage according to PWM control scheme of the present disclosure with waveforms of 60° DPWM in the related art by varying the modulation index MI according to the weight set as shown in FIG. 8.

In FIG. 9, the modulation index MI of the PWM control scheme according to the embodiment of the present disclosure is set to 0.5. FIG. 9 shows a waveform 901(*a*) of a pole-voltage signal in 60° DPWM scheme in the related art, and a waveform 902(*a*) of a pole-voltage signal in PWM control scheme according to an embodiment of the present disclosure. Since the modulation index MI is lower than the discontinuous modulation start point MI start, the waveform 902(*a*) of the pole-voltage signal in PWM control scheme according to the embodiment of the present disclosure is identical to the waveform of the pole-voltage signal of SPWM.

In addition, FIG. 9 shows a waveform 901(*b*) of an offset voltage in 60° DPWM scheme in the related art, and a waveform 902(*b*) of an offset voltage in PWM control scheme according to an embodiment of the present disclosure. Since the modulation index MI is lower than the discontinuous modulation start point MI_start, the waveform 902(*b*) of the offset voltage in PWM control scheme according to the embodiment of the present disclosure becomes 0.

In FIG. 10, the modulation index MI of the PWM control scheme according to the embodiment of the present disclosure is set to 0.7. FIG. 10 shows a waveform 1001(*a*) of a pole-voltage signal in 60° DPWM scheme in the related art, and a waveform 1002(*a*) of a pole-voltage signal in PWM control scheme according to an embodiment of the present disclosure. Since the modulation index MI is larger than the discontinuous modulation start point MI_start, the PWM control unit 104 according to the embodiment of the present disclosure start to operate in the discontinuous modulation mode. However, as shown in FIG. 10, the waveform 1002(*a*) of the pole-voltage signal in the PWM control scheme according to the embodiment of the present disclosure is smaller than the waveform 1001(*a*) of the pole-voltage signal in 60° DPWM scheme in the related art.

In addition, FIG. 10 shows a waveform 1001(*b*) of an offset voltage in 60° DPWM scheme in the related art, and a waveform 1002(*b*) of an offset voltage in the PWM control scheme according to the embodiment of the present disclosure. As shown in FIG. 10, the waveform 1002(*a*) of the offset voltage in the PWM control scheme according to the embodiment of the present disclosure is not completely identical to the waveform 1002(*b*) of the offset voltage in 60° DPWM scheme in the related art.

In FIG. 11, the modulation index MI of the PWM control scheme according to the embodiment of the present disclosure is set to 2/√3, and accordingly the weight k becomes 1. Accordingly, as shown in FIG. 11, the waveform of the pole-voltage signal in the PWM control scheme according to the embodiment of the present disclosure is identical to the waveform of the pole-voltage signal in the 60° DPWM scheme in the related art (as indicated by reference numeral 1101(*a*)), and the waveform of the offset voltage in the PWM control scheme according to the embodiment of the present disclosure is also identical to the waveform of the offset voltage in the 60° DPWM scheme in the related art (as indicated by reference numeral 1101(*b*)). That is, the PWM control unit 104 according to the embodiment of the present disclosure performs voltage modulation according to 60° DPWM scheme.

As shown in FIGS. 9 to 11, according to the PWM control scheme of the embodiment of the present disclosure, the PWM control unit 104 operates in SPWM mode when the modulation index MI is smaller than the discontinuous modulation start point MI start, and the discontinuous modulation period increases when the modulation index MI is equal to or larger than the discontinuous modulation start point MI_start. In addition, when the modulation index is 2/√3, the PWM control unit 104 operates in 60° DPWM mode, such that it has the maximum discontinuous modulation period for a cycle.

Figure 12:
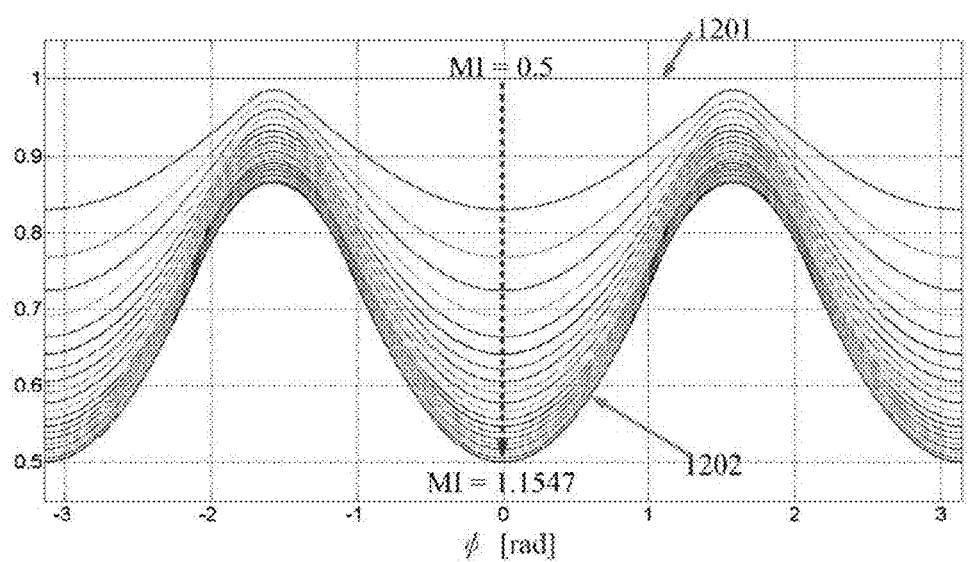
FIG. 12 is a graph showing an embodiment of a ratio of switching loss in each of the modulation schemes with respect to switching loss in the continuous modulation scheme according to phase difference ϕ between the phase-voltage signals and the phase-current.

FIG. 12 is a graph showing a ratio of switching loss in each of the modulation schemes with respect to switching loss in the continuous modulation scheme according to phase difference ϕ between the phase-voltage signals and the phase-current.

In FIG. 12, the discontinuous modulation start point MI_start is set to 0.5, and the weight k is set as in FIG. 8. FIG. 12 shows switching loss 1201 in the PWM control mode according to the embodiment of the present disclosure when the modulation index MI is 0.5, which is equal to switching loss in SPWM. Further, FIG. 12 shows switching loss 1202 in the PWM control mode according to the embodiment of the present disclosure when the modulation index MI is changed from the discontinuous modulation start point MI_start to 2/√3. In FIG. 12, the switching loss when the modulation index MI is 2/√3 is equal to switching loss in 60° DPWM in the related art.

Figure 13:
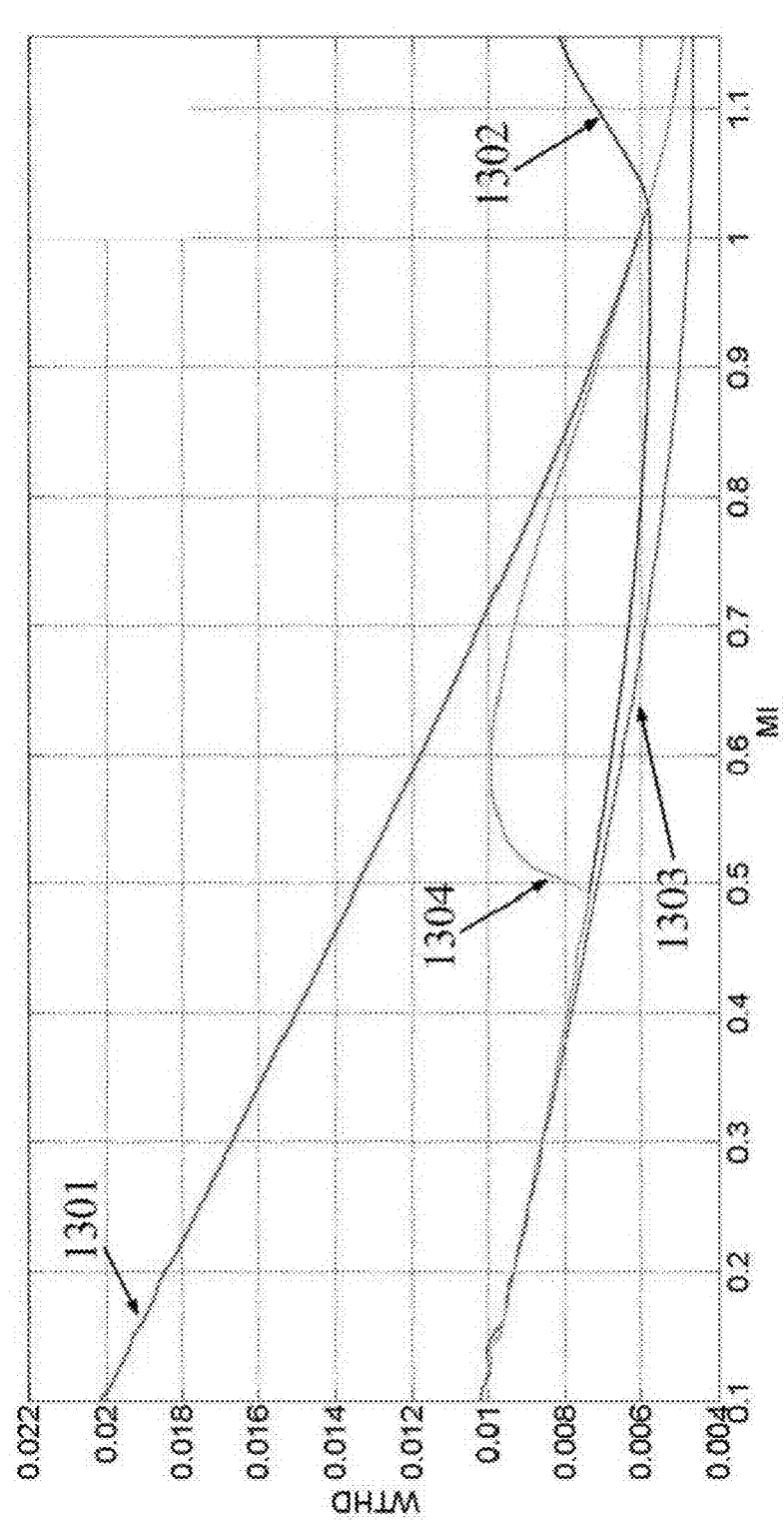
FIG. 13 is a graph for comparing weighted total harmonic distortion (WTHD) in continuous voltage modulation scheme and discontinuous voltage modulation scheme in the related art with WTHD in the method for generating offset voltage according to an embodiment of the present disclosure.

FIG. 13 is a graph for comparing weighted total harmonic distortion (WTHD) in continuous modulation scheme and discontinuous modulation scheme in the related art with WTHD in the method for generating offset voltage according to an embodiment of the present disclosure.

The WTHD shown in FIG. 13 is defined as follows:

$$WTHD = \frac{\sqrt{\sum_{n=2}^{\infty}\left(\frac{V_n}{n\omega_1 L}\right)^2}}{\frac{V_1}{\omega_1 L}} = \frac{\sqrt{\sum_{n=2}^{\infty}\left(\frac{V_n}{n}\right)^2}}{V_1} \quad \text{[Equation 12]}$$

where ω1 denotes the frequency of fundamental wave, V1 denotes the magnitude of fundamental wave, n denotes the order of harmonic, and $V_n$ denotes the magnitude of n-order harmonic.

FIG. 13 shows WTHD 1301 in 60° DPWM scheme in the related art, WTHD 1302 in SPWM scheme in the related art, WTHD 1303 in SVPWM scheme in the related art, and WTHD 1304 in PWM control scheme according to an embodiment of the present disclosure.

As shown in FIG. 13, the WTHD 1304 in PWM control scheme according to the embodiment of the present disclosure is identical to the WTHD 1302 in SPWM scheme in the related art when the modulation index MI is equal to or less than the discontinuous modulation start point MI_start. However, when the modulation index MI becomes larger than the discontinuous modulation start point MI_start, the discontinuous modulation period increases, such that the WTHD 1304 gradually increases. Even though the WTHD 1304 in PWM scheme according to the embodiment of the present disclosure increases, it always remains lower than the WTHD 1301 in 60° DPWM scheme in the related art.

The PWM control scheme according to the embodiment of the present disclosure described above is a voltage modulation method in which a zero sequence voltage or an offset voltage calculated using the phase-voltage signals, the limiters and the weight are compared with a triangular wave. The smooth switching from the continuous voltage modulation mode to the discontinuous voltage modulation mode can be achieved by adding up differences between phase-voltage signals and respective limit voltage signals after having passed the limiters. In addition, the discontinuous voltage modulation period can be adjusted by adjusting the maximum limit value and the minimum limit value defined by weight input to the limiters.

By utilizing the offset voltage thus generated, the PWM control unit operates in the continuous modulation mode when the modulation index is set to a value below the discontinuous modulation start point, whereas the PWM control unit is switched to the discontinuous modulation mode when the modulation index becomes larger than the discontinuous modulation start point. By applying the PWM control scheme according to an embodiment of the present disclosure to an inverter for an ESS, an inverter for a photovoltaic module, an inverter for motor drive, etc., the THD can be reduced even in a period with a low modulation index by adjusting the discontinuous modulation period compared to the discontinuous modulation scheme in the related art. Further, switching loss can also be reduced in comparison with the continuous modulation scheme in the related art. Consequently, the THD in current does not exceed the tolerance in each of drive points, while reducing switching loss.

The present disclosure described above may be variously substituted, altered, and modified by those skilled in the art to which the present disclosure pertains without departing from the scope and sprit of the present disclosure. Therefore, the present disclosure is not limited to the above-mentioned embodiments and the accompanying drawings.

What is claimed is:

1. An offset voltage generator in a three-phase inverter, the three-phase inverter operating in a continuous modulation mode or a discontinuous modulation mode, the offset voltage generator comprising:
   a first limiter configured to compare a first phase-voltage signal with a maximum limit value and a minimum limit value to output a first limit-voltage signal;
   a second limiter configured to compare a second phase-voltage signal with the maximum limit value and the minimum limit value to output a second limit-voltage signal;
   a third limiter configured to compare a third phase-voltage signal with the maximum limit value and the minimum limit value to output a third limit-voltage signal; and
   a summer configured to add up a difference between the first phase-voltage signal and the first limit-voltage signal, a difference between the second phase-voltage signal and the second limit-voltage signal, and a difference between the third phase-voltage signal and the third limit-voltage signal, to output an offset voltage,
   wherein the maximum limit value and the minimum limit value are determined by a predetermined weight and a DC link voltage of the three-phase inverter.

2. The offset voltage generator of claim 1, wherein the first limiter, the second limiter and the third limiter are configured to:
   output the first phase-voltage signal as the first limit-voltage signal, the second phase-voltage signal as the second limit-voltage signal, and the third phase-voltage signal as the third limit-voltage signal, respectively, if the first phase-voltage signal, the second phase-voltage signal and the third phase-voltage signal are between the minimum limit value and the maximum limit value;
   output the minimum limit value as the first limit-voltage signal, as the second limit-voltage signal, and as the third limit-voltage signal, respectively, if the first phase-voltage signal, the second phase-voltage signal and the third phase-voltage signal are less than the minimum limit value; and
   output the maximum limit value as the first limit-voltage signal, as the second limit-voltage signal, and as the third limit-voltage signal, respectively, if the first phase-voltage signal, the second phase-voltage signal and the third phase-voltage signal are greater than the maximum limit value.

3. The offset voltage generator of claim 1, wherein the three-phase inverter operates in the continuous modulation mode if the first phase-voltage signal, the second phase-voltage signal and the third phase-voltage signal are between the minimum limit value and the maximum limit value, and
   the three-phase inverter operates in the discontinuous modulation mode if the first phase-voltage signal, the second phase-voltage signal and the third phase-voltage signal are less than the minimum limit value or greater than the maximum limit value.

4. The offset voltage generator of claim 1, wherein the three-phase inverter operates in the discontinuous modulation mode if the predetermined weight lies within a predetermined discontinuous operation range, and
the three-phase inverter operates in the continuous modulation mode if the predetermined weight does not lie within the predetermined discontinuous operation range.

5. The offset voltage generator of claim 4, wherein the predetermined discontinuous operation range is defined as:

$$\frac{\sqrt{3}}{2} \le \frac{k}{MI} \le 1, 0 \le k \le 1$$

wherein k denotes the predetermined weight, and MI denotes a modulation index.

6. A three-phase inverter control device for controlling switching operations of a plurality of switching elements in a three-phase inverter, the three-phase inverter control device comprising:
a pole-voltage signal generator configured to compare a first phase-voltage signal, a second phase-voltage signal and a third phase-voltage signal with a maximum limit value and a minimum limit value, respectively, to generate an offset voltage, and add the offset voltage to the first phase-voltage signal, the second phase-voltage signal and the third phase-voltage signal to generate a first pole-voltage signal, a second pole-voltage signal and a third pole-voltage signal, respectively; and
a control signal generator configured to compare the first pole-voltage signal, the second pole-voltage signal and the third pole-voltage signal with a carrier wave, to generate control signals for the plurality of switching elements,
wherein the maximum limit value and the minimum limit value are determined by a predetermined weight and a DC link voltage of the three-phase inverter.

7. The three-phase inverter control device of claim 6, wherein the pole-voltage signal generator comprises an offset voltage generator configured to generate the offset voltage, and
the offset voltage generator comprises:
a first limiter configured to compare the first phase-voltage signal with a maximum limit value and a minimum limit value to output a first limit-voltage signal;
a second limiter configured to compare the second phase-voltage signal with the maximum limit value and the minimum limit value to output a second limit-voltage signal;
a third limiter configured to compare the third phase-voltage signal with the maximum limit value and the minimum limit value to output a third limit-voltage signal; and
a summer configured to add up a difference between the first phase-voltage signal and the first limit-voltage signal, a difference between the second phase-voltage signal and the second limit-voltage signal, and a difference between the third phase-voltage signal and the third limit-voltage signal, to output an offset voltage.

8. The three-phase inverter control device of claim 6, wherein the three-phase inverter operates in a continuous modulation mode if the first phase-voltage signal, the second phase-voltage signal and the third phase-voltage signal are between the minimum limit value and the maximum limit value, and
the three-phase inverter operates in a discontinuous modulation mode if the first phase-voltage signal, the second phase-voltage signal and the third phase-voltage signal are less than the minimum limit value or greater than the maximum limit value.

9. The three-phase inverter control device of claim 6, wherein the three-phase inverter operates in a discontinuous modulation mode if the predetermined weight lies within a predetermined discontinuous operation range, and
the three-phase inverter operates in a continuous modulation mode if the predetermined weight does not lie within the predetermined discontinuous operation range.

10. The three-phase inverter control device of claim 9, wherein the predetermined discontinuous operation range is defined as:

$$\frac{\sqrt{3}}{2} \le \frac{k}{MI} \le 1, 0 \le k \le 1$$

wherein k denotes the predetermined weight, and MI denotes a modulation index.

* * * * *